March 25, 1947.    L. H. BROWNE    2,417,968
CHECK VALVE
Filed Jan. 6, 1944
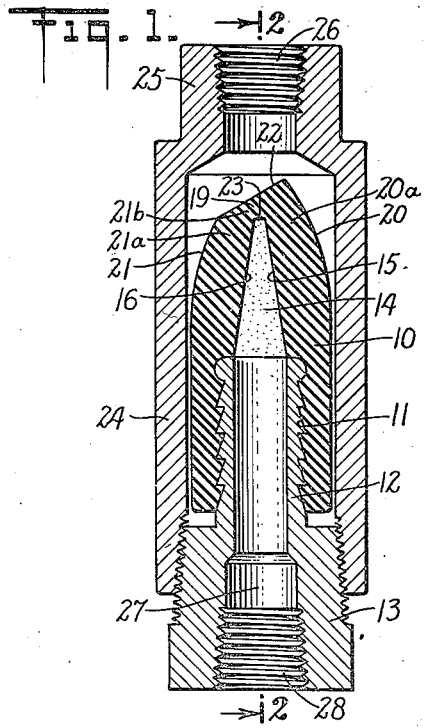
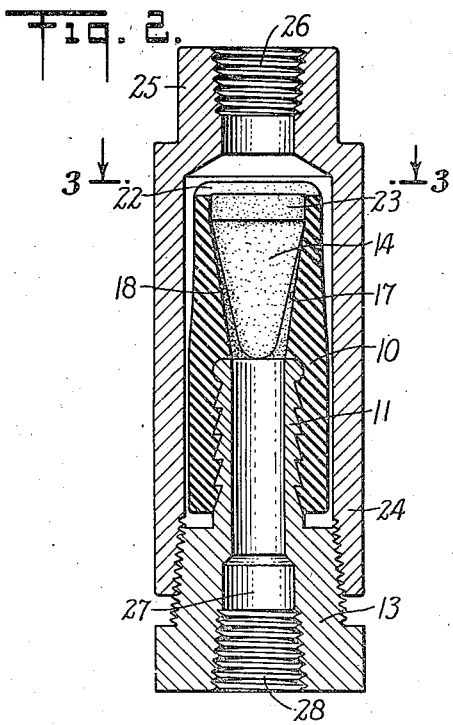
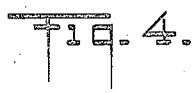
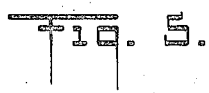
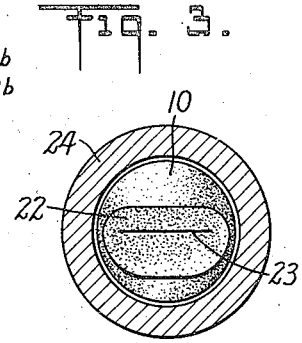
INVENTOR
*Lindsay H. Browne*
BY
*Van Deventer & Grier*
ATTORNEYS Patented Mar. 25, 1947

2,417,968

UNITED STATES PATENT OFFICE 2,417,968

CHECK VALVE

Lindsay H. Browne, Westport, Conn., assignor to American Brake Shoe Company, a corporation of Delaware Application January 6, 1944, Serial No. 517,162

3 Claims. (Cl. 251—122)

1

This invention relates to improvements in check valves and has for an object the provision of a check valve formed of rubber, or the like, having a passage formed therein for a fluid medium, said passage terminating in a tapered abutment at the end thereof, and the slitting of said abutment to form the valve per se.

Another object of the invention is the provision of a check valve formed of rubber, or the like, and including a slitted valve end, one lip of which contains more mass than the other.

A further object of the invention is the provision, in a check valve, of a slitted valving member formed of rubber, or the like, a shank for communicating with the interior of said valving member and forming a support therefor, and a casing secured to said shank and forming a closure for the valving member, said shank and said casing having passages formed therein adapted to be connected to fittings for conveying the fluid medium.

Other objects and advantages of the invention will be apparent to those skilled in the art upon a study of the following specification and the accompanying drawings.

In the drawings:

Figure 1 is a sectional elevation of one embodiment of my new and improved valve;

Figure 2 is a sectional elevation as seen along the lines 2—2 of Figure 1;

Figure 3 is a sectional view of the casing as seen along the lines 3—3 of Figure 2, and showing a plan view of the end of the valving member;

Figure 4 is a view similar to Figure 2 showing a further modification of the valving member; and Figure 5 is a sectional elevation showing a further modification of the arrangement shown in Figure 2.

My new and improved valve consists of a body 10 generally cylindrical in form and having a stepped hole 11 formed therein for engaging a correspondingly stepped bushing 12, which bushing may be formed integral with a threaded fitting 13.

Communicating with the stepped hole 11 is a tapered cavity 14 wherein the walls 15 and 16 converge toward each other and the walls 17 and 18 diverge.

The apex of the cavity 14 is bounded by a solid abutment of the rubber, or like, material 19. When the body 10 is molded, the abutment 19 is imperforate. The straight sides of the body terminate along curved lines 20 and 21 on the exterior surface thereof and these curved lines join a beveled flat area 22 on top thereof.

2

After the body is molded, the abutment 19 is pierced or slit (for example, with a knife) along the line 23, with the result that the "set" of the molding maintains the slit 23 closed. The closure of the slit 23 is further augmented by the relatively heavy cross-section 20ᵃ on one side thereof and 21ᵃ on the other side thereof.

The fact that the surface 22 is beveled facilitates the operating of the valve, due to the fact that the portion 20ᵃ is comparatively stiff and the section 21ᵇ is therefore more flexible. I have found that the formation of the body in the manner shown about the slit 23 eliminates the chances of any vibrating noises being instituted while the valve is operating.

A tubular casing 24 has its lower end interiorly threaded and these threads sealingly engage the threads on the fitting 13. The upper end of the tubular casing 24 is provided with a boss 25 having a threaded hole 26 formed therein. The fitting 13 also has a passage 27 formed therein, the outer end 28 of which is threaded to accommodate a suitable fitting.

In the form shown in Figure 4, the beveled flat area 22ᵃ lies in a plane at right angles to the plane in which the surface 22 (shown in Figure 1) lies, with the result that the cooperating faces of the lips formed by the slit 23ᵃ are irregular in shape instead of being rectangular, as shown at 23 in Figure 2. By so forming the abutment 19ᵃ, the cooperating faces of the slit 23ᵃ are substantially narrower at the edge 29 than they are at the edge 30, with the result that when a fluid medium under pressure passes into the interior of the body 10ᵃ, the faces of the slit 23ᵃ adjacent to the edge 29 open first and, as the pressure builds up, the slit continues to open toward the right, as viewed in Figure 4.

This effect may also be obtained in the modification shown in Figure 5, wherein the inner boundary 31 of the abutment is angular and the outer face 22ᵇ is at substantially a right angle to the axis of the valve. This construction results in the cooperative faces 23ᵇ of the slit terminating along a short edge 29ᵇ on one side thereof and along a longer edge 30ᵇ on the other side thereof.

Above I have described a preferred form of check valve formed of rubber, or the like, and have described it in connection with a suitable casing or housing to which suitable piping may be attached, and in view of the fact that tests on these valves show that the valve is equally efficient on air or gases under pressure and on liquids under pressure, some of these operating at as much as 1200 lbs. per square inch, the valve may be also used to handle large volumes by grouping several units in a common casing.

It has been found that by molding the bodies 10 with a solid abutment formed at the closed end and subsequently slitting this barrier, the natural set of the mass of rubber forming the barrier is conducive to forcing the severed surfaces together and maintain the valve normally closed. This effect is aided and abetted by the pressure on the exterior surfaces of the body, particularly along the surfaces indicated by the numerals 20 and 21. Although I have herein shown and described an improved method of forming a valve of rubber, and have shown several modifications, it is obvious that many changes may be made in the arrangements herein set forth without departing from the spirit of the invention as outlined in the following claims.

Having described my invention, what I claim is:

1. In a check valve, a body formed of moulded rubber-like material having steps in an interior bore extending inwardly from one end thereof and adapted to receive a correspondingly stepped fitting, the opposite end of said body converging to form an apex, an interior cavity formed in said body and having one end communicating with said bore and the opposite end closed by the apex end of said body to form a barrier, a pair of normally cooperating seating faces formed by a cut extending through said barrier on a plane lying on the longitudinal axis of said body, the outer surface of said apex lying on a plane forming an angle of substantially less than ninety degrees with said first mentioned plane.

2. In a check valve, a body formed of moulded rubber-like material and having steps in an interior bore extending inwardly from one end thereof and adapted to receive a correspondingly stepped fitting, the opposite end of said body converging to form an apex, the outer surface of which is angular with respect to the longitudinal axis of said body, an interior cavity formed in said body and having one end communicating with said bore and the opposite end closed by the apex end of said body to form a barrier, said barrier being of varying cross-section due to the angularity of the outer surface of said apex, and a pair of cooperating seating faces formed by a cut extending through said barrier.

3. In a check valve, a body formed of moulded rubber-like material and having steps in an interior bore extending inwardly from one end thereof and adapted to receive a correspondingly stepped fitting, the opposite end of said body converging to form an apex, an interior cavity formed in said body and having one end communicating with said bore and the opposite end closed by the apex end of said body to form a barrier, and a pair of cooperating seating faces formed by a cut extending through said barrier, said barrier being thicker adjacent to one end of said cut than it is at the opposite end of said cut, thereby making said seating surfaces narrower on said second mentioned end than on said first mentioned end of said cut.

LINDSAY H. BROWNE.

REFERENCES CITED

The following references are of record in the file of this patent:

UNITED STATES PATENTS

| Number | Name | Date |
|---|---|---|
| 2,014,153 | Taylor | Sept. 10, 1935 |
| 1,930,107 | Rang | Oct. 10, 1933 |
| 2,320,906 | Bent | June 1, 1943 |
| 1,630,040 | Vogt | May 24, 1927 |
| 2,000,735 | Arnold | May 7, 1935 |
| Re. 14,943 | Jackson | Aug. 31, 1920 |
| 1,343,735 | MacBryde | June 15, 1920 |
| 657,007 | Richter | Aug. 28, 1900 |

FOREIGN PATENTS

| Number | Country | Date |
|---|---|---|
| 591,502 | French | Apr. 10, 1925 |
| 9,477 | British | June 4, 1891 |
| 27,019 | British | Nov. 18, 1897 |